(12) United States Patent
Kim et al.

(10) Patent No.: US 12,346,629 B2
(45) Date of Patent: Jul. 1, 2025

(54) SERVER AND CONTROL METHOD THEREFOR

(71) Applicant: SAMSUNG ELECTRONICS CO., LTD., Suwon-si (KR)

(72) Inventors: Doyoung Kim, Suwon-si (KR); Sanghyup Lee, Suwon-si (KR); Sangwon Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/625,967

(22) Filed: Apr. 3, 2024

(65) Prior Publication Data

US 2024/0281193 A1    Aug. 22, 2024

Related U.S. Application Data

(63) Continuation of application No. PCT/KR2022/014387, filed on Sep. 27, 2022.

(30) Foreign Application Priority Data

Oct. 27, 2021 (KR) .................. 10-2021-0144961

(51) Int. Cl.
*G06F 3/147* (2006.01)
*G09G 3/36* (2006.01)

(52) U.S. Cl.
CPC ............ *G06F 3/147* (2013.01); *G09G 3/36* (2013.01); *G09G 2320/0242* (2013.01);
(Continued)

(58) Field of Classification Search
None
See application file for complete search history.

(56) References Cited

U.S. PATENT DOCUMENTS 8,565,522 B2 * 10/2013 Swic ................. H04N 9/77
345/589
8,643,662 B2    2/2014 Tran et al.
(Continued)

FOREIGN PATENT DOCUMENTS

JP    2008-225372 A    9/2008
JP    2017-203948 A    11/2017
(Continued)

OTHER PUBLICATIONS

International Search Report dated Jan. 20, 2023, issued by the International Searching Authority in counterpart International Application No. PCT/KR2022/014387 (PCT/ISA/210).
(Continued)

*Primary Examiner* — Fred Tzeng
(74) *Attorney, Agent, or Firm* — Sughrue Mion, PLLC

(57) ABSTRACT

A server includes: a communication interface; and at least one processor configured to: receive, from a plurality of display devices, image quality setting values of each display device, sensing values of a surrounding environment obtained from each display device, and information on an image quality mode of each display device, identify, based on the received image quality setting values and the sensing values, an optimal image quality setting value for each sensing value, identify, based on the received information on the image quality mode, a display device in which the image quality mode is set in a pre-set mode from among the plurality of display devices, and transmit, to the identified display device and based on the optimal image quality setting value for each sensing value, an optimal image quality setting value corresponding to sensing values of the surrounding environment sensed by the identified display device.

20 Claims, 12 Drawing Sheets

(52) U.S. Cl.
CPC ............. *G09G 2320/066* (2013.01); *G09G 2320/0666* (2013.01); *G09G 2320/0693* (2013.01); *G09G 2354/00* (2013.01); *G09G 2360/144* (2013.01); *G09G 2370/022* (2013.01)

(56) References Cited

U.S. PATENT DOCUMENTS

| | | | |
|---|---|---|---|
| 10,681,302 B2 | 6/2020 | Wang et al. | |
| 11,074,870 B2 | 7/2021 | Lee et al. | |
| 11,610,562 B2 | 3/2023 | Hur et al. | |
| 2002/0038462 A1* | 3/2002 | Sakakibara | H04N 9/3185 353/69 |
| 2002/0131072 A1* | 9/2002 | Jackson | G06F 16/9577 358/1.15 |
| 2004/0075665 A1* | 4/2004 | Ito | G06F 3/14 345/581 |
| 2004/0100478 A1* | 5/2004 | Bianchi | H04N 23/63 348/E5.047 |
| 2009/0096933 A1* | 4/2009 | Iijima | H04N 5/775 348/700 |
| 2009/0219442 A1 | 9/2009 | Hironaka et al. | |
| 2009/0268960 A1* | 10/2009 | Imai | H04N 5/57 348/739 |
| 2011/0069081 A1* | 3/2011 | Lee | G09G 5/14 345/581 |
| 2017/0171940 A1 | 6/2017 | Feng | |
| 2020/0135127 A1* | 4/2020 | Jung | G09G 5/10 |
| 2021/0195296 A1 | 6/2021 | Aoyagi et al. | |
| 2022/0392420 A1* | 12/2022 | Harwell | G09G 5/06 |

FOREIGN PATENT DOCUMENTS

| | | |
|---|---|---|
| JP | 2019-120781 A | 7/2019 |
| KR | 10-2009-0102392 A | 9/2009 |
| KR | 10-2010-0052961 A | 5/2010 |
| KR | 10-1149216 B1 | 5/2012 |
| KR | 10-2017-0098120 A | 8/2017 |
| KR | 10-2020-0046605 A | 5/2020 |
| KR | 10-2020-0134782 A | 12/2020 |
| KR | 10-2021-0033141 A | 3/2021 |
| KR | 10-2021-0046658 A | 4/2021 |

OTHER PUBLICATIONS

Written Opinion dated Jan. 20, 2023, issued by the International Searching Authority in counterpart International Application No. PCT/KR2022/014387 (PCT/ISA/237).

* cited by examiner

FIG. 6B

DATA SET EXAMPLE OF USER SETTING INFORMATION ("ID" : 'xxxxxxxxx', 'display_info' : 'xxxxxxxxxx'
    'picture_mode' : 0, 'sensor_mode' :0,
    'BL' : 100, 'CT' : 75, 'SN' : 30, 'col_R' : 50, 'col_G' : 50, 'col_B' : 50,
    'sensor_lx' : 230, 'sensor_T' : 6500 )

ID : USER IDENTIFICATION ID
display_info : DISPLAY MODEL NAME
picture_mode : SCREEN MODE : 0-USER ADJUSTMENT, 1-MODE 1, 2-MODE 2 ETC.
sensor_mode : USER SETTING MODE WHEN SETTING IMAGE QUALITY:0-OFF, 1-OPTIMUM, 2-AI
BL : Backlight-BRIGHTNESS VALUE
CT : Contrast-CONTRAST VALUE
SN : Sharpness-SHARPNESS VALUE
col_R : COLOR R VALUE
col_G : COLOR G VALUE
col_B : COLOR B VALUE
sensor_lx : ILLUMINANCE SENSOR VALUE
sensor_T : COLOR SENSOR COLOR TEMPERATURE VALUE

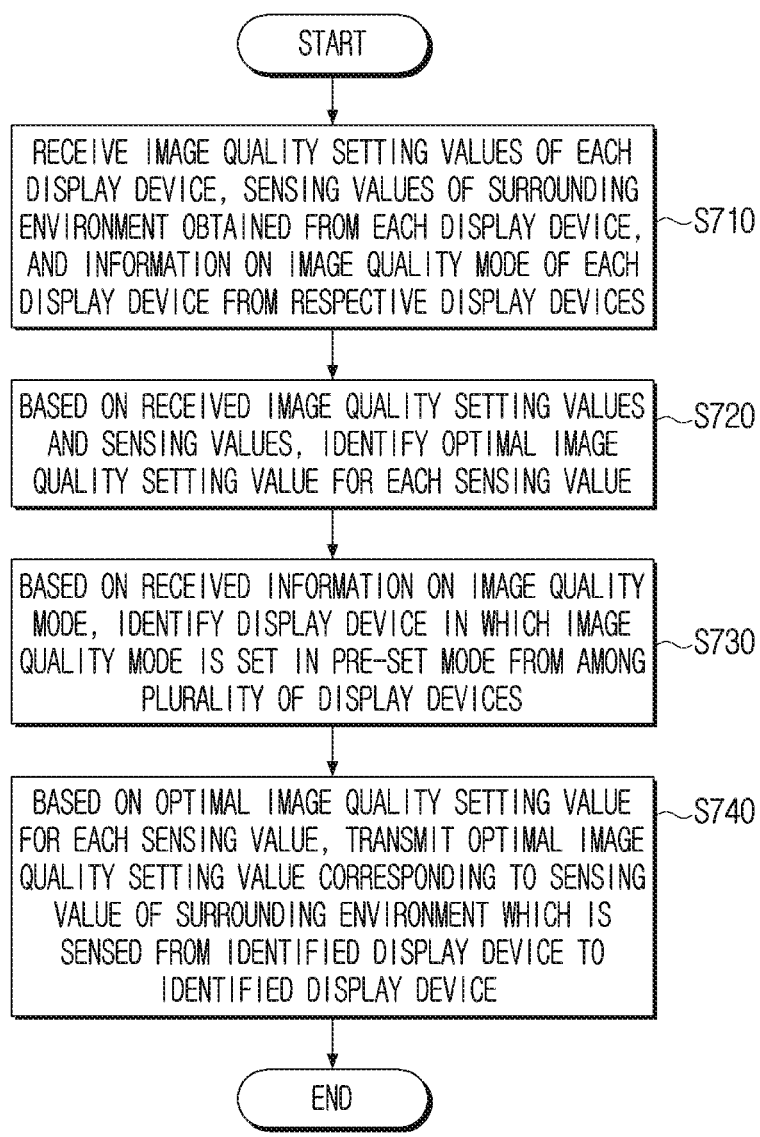

SERVER AND CONTROL METHOD THEREFOR

CROSS-REFERENCE TO RELATED APPLICATION(S)

This application is a continuation application of International Application No. PCT/KR2022/014387, filed on Sep. 27, 2022, which is based on and claims priority to Korean Patent Application No. 10-2021-0144961, filed on Oct. 27, 2021, in the Korean Intellectual Property Office, the disclosures of which are incorporated by reference herein in their entireties.

BACKGROUND

1. Field

The disclosure relates to a server and a control method therefor, and more particularly, to a server which provides an optimal image quality setting value that corresponds to a surrounding environment of a display device and a control method therefor.

2. Description of Related Art

With recent developments in display technology, various display devices such as mobile phones, tablet personal computers (PCs), and virtual reality (VR) devices are being developed in addition to large-scale display devices such as televisions (TVs).

As display devices of a wide range are being developed, environments in which individual display devices are used have also become quite diverse. Specifically, because of increased cases of a user individually using the recently developed display devices, individual image quality settings optimized to the surrounding environment are important. Accordingly, recent display devices provide a function which automatically sets an optimal image quality so as to provide users with a comfortable viewing experience according to an illuminance or color temperature of the surrounding environment by proceeding with tuning which is suitable to a user environment under various lighting.

However, even if the image quality is set to a pre-set value, it may not be able to capture various actual use environments of an actual user. For example, because a desired image quality setting may be different for each user such as when seeing how dark the display is set in a dark setting and re-adjusting brightness, it is necessary to provide an optimal image quality by reflecting image quality setting preferences of users.

SUMMARY

Provided is a server which senses lighting information of a surrounding environment of a display device, which provides an image quality setting corresponding to lighting information together with the lighting information to an external server, the external server identifying an optimal image quality setting by collecting data on image quality setting methods of these individual users and providing to the display device, and which adjusts an image quality of the display device based on the identified optimal image quality setting, and in providing a display system.

According to an aspect of the disclosure, a server includes: a communication interface; and at least one processor configured to: receive, from a plurality of display devices through the communication interface, image quality setting values of each display device of the plurality of display devices, sensing values of a surrounding environment obtained from each display device of the plurality of display devices, and information on an image quality mode of each display device of the plurality of display devices, identify, based on the received image quality setting values and the sensing values, an optimal image quality setting value for each sensing value, identify, based on the received information on the image quality mode, a display device in which the image quality mode is set in a pre-set mode from among the plurality of display devices, and transmit, to the identified display device through the communication interface and based on the optimal image quality setting value for each sensing value, an optimal image quality setting value corresponding to sensing values of the surrounding environment sensed by the identified display device.

The image quality setting values of each display device may include at least one of a brightness value, a contrast value, a sharpness value, and RGB color values of a corresponding display device of the plurality of display devices.

Each of the plurality of display devices may include an illuminance sensor and a color sensor, and the sensing values of the surrounding environment obtained from each display device may include an illuminance value obtained through the illuminance sensor and a color temperature value obtained through the color sensor of each display device.

The at least one processor may be further configured to: identify a first optimal image quality setting value by illuminance value based on the illuminance value of each display device received through the communication interface, and identify a second optimal image quality setting value by color temperature value based on the color temperature value of each display device received through the communication interface, the first optimal image quality setting value may include the brightness value, the contrast value, and the sharpness value, and the second optimal image quality setting value may include RGB color values.

The pre-set mode may be a third mode from among a first mode for setting an image quality setting value of a display device by a user setting regardless of the sensing values of the surrounding environment received from the display device, a second mode for setting an image quality setting value of the display device based on an image quality setting value pre-set in the display device according to the sensing values of the surrounding environment received from the display device, and the third mode for setting an image quality setting value of the display device based on the optimal image quality setting value received from the server according to the sensing values of the surrounding environment received from the display device.

The at least one processor may be further configured to: identify, based on the received image quality setting values and the sensing values, a plurality of image quality setting values corresponding to each sensing value, and identify a median value from among the identified plurality of image quality setting values as the optimal image quality setting value corresponding to each sensing value.

The at least one processor may be further configured to: identify, based on the received image quality setting values and the sensing values, a plurality of image quality setting values corresponding to each sensing value, divide the identified plurality of image quality setting values into a plurality of sections, identify a section in which image quality setting values belong the most from among the plurality of sections, and identify a median value of the identified section as the optimal image quality setting value corresponding to each sensing value.

The at least one processor may be further configured to: divide the image quality setting values of each device and the sensing values of the surrounding environment obtained from each display device into a plurality of groups based on model names of the plurality of display devices, and identify, based on the image quality setting values and the sensing values in the respective groups, the optimal image quality setting value for each sensing value.

According to an aspect of the disclosure, a control method of a server, includes: receiving, from a plurality of display devices, image quality setting values of each display device of the plurality of display devices, sensing values of a surrounding environment obtained from each display device of the plurality of display devices, and information on an image quality mode of each display device of the plurality of display devices; identifying, based on the received image quality setting values and the sensing values, an optimal image quality setting value for each sensing value; identifying, based on the received information on the image quality mode, a display device in which the image quality mode is set in a pre-set mode from among the plurality of display devices; and transmitting, to the identified display device and based on the optimal image quality setting value for each sensing value, an optimal image quality setting value corresponding to the sensing values of the surrounding environment sensed by the identified display device.

The image quality setting value of each display device may include at least one of a brightness value, a contrast value, a sharpness value, and RGB color values of each display device.

Each of the plurality of display devices may include an illuminance sensor and a color sensor, and the sensing values of the surrounding environment obtained from each display device may include an illuminance value obtained through the illuminance sensor and a color temperature value obtained through the color sensor of each display device.

The identifying an optimal image quality setting value for each sensing value may include: identifying a first optimal image quality setting value by illuminance value based on the illuminance value of each display device received through the communication interface; and identifying a second optimal image quality setting value by color temperature value based on the color temperature value of each display device received through the communication interface, the first optimal image quality setting value may include the brightness value, the contrast value, and the sharpness value, and the second optimal image quality setting value may include the RGB color values.

The pre-set mode may be a third mode from among a first mode for setting an image quality setting value of a display device by a user setting regardless of the sensing values of the surrounding environment obtained from the display device, a second mode for setting an image quality setting value of the display device based on an image quality setting value pre-set in the display device according to the sensing values of the surrounding environment obtained from the display device, and the third mode for setting an image quality setting value of the display device based on the optimal image quality setting value received from the server according to the sensing values of the surrounding environment obtained by the display device.

The identifying an optimal image quality setting value for each sensing value may include: identifying, based on the received image quality setting values and the sensing values, a plurality of image quality setting values corresponding to each sensing value; and identifying a median value from among the identified plurality of image quality setting values as the optimal image quality setting value corresponding to each sensing value.

The identifying an optimal image quality setting value for each sensing value may include: identifying, based on the received image quality setting values and the sensing values, a plurality of image quality setting values corresponding to each sensing value; dividing the identified plurality of image quality setting values into a plurality of sections; identifying a section in which image quality setting values belong the most from among the plurality of sections; and identifying a median value of the identified section as the optimal image quality setting value corresponding to each sensing value.

According to one or more embodiments of the disclosure, an optimal image quality reflecting image quality setting preferences of users may be provided by controlling an image quality of an image which is displayed in a display device based on an optimal image quality setting value received from an external server.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6B is an example diagram of a data set which is transmitted by a display device to a server according to an embodiment of the disclosure; and FIG. 7 is a flowchart illustrating an control method of a server which provides an optimal image quality setting value corresponding to a surrounding environment of a display device according to an embodiment of the disclosure.

DETAILED DESCRIPTION

Example embodiments of the disclosure will be described in detail below with reference to the accompanying drawings.

Terms used in describing embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," and "may include" are used to designate a presence of a corresponding characteristic (e.g., elements such as numerical value, function, operation, or component), and not to preclude a presence or a possibility of additional characteristics.

The expression "at least one of A and B" is to be understood as indicating any one of "A" or "B" or "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

Figure 1:
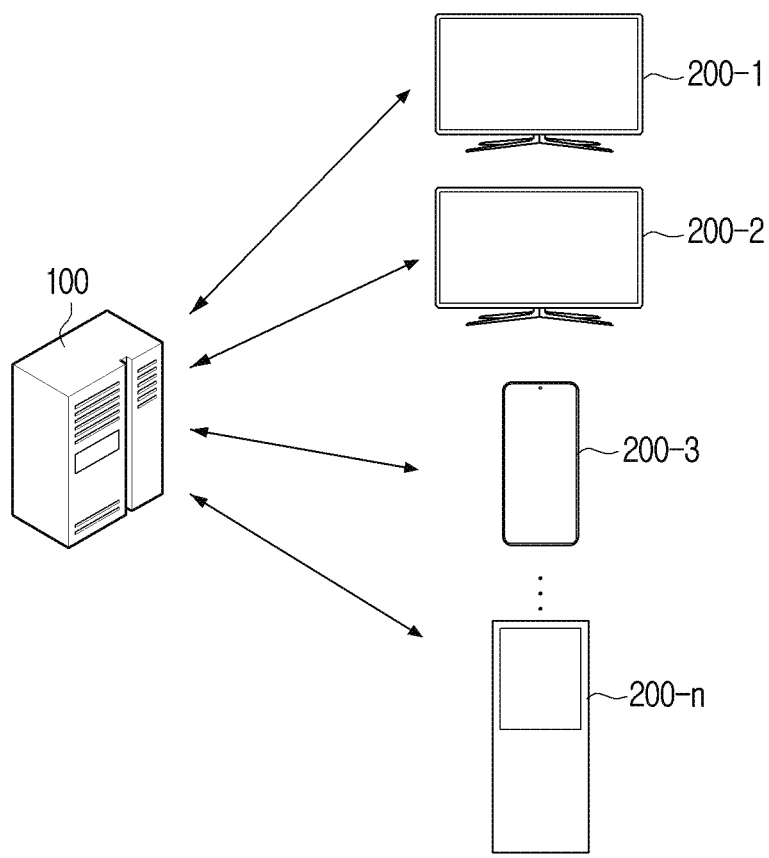
FIG. 1 is a diagram illustrating a display system according to an embodiment of the disclosure.

FIG. 1 is a diagram illustrating a display system according to an embodiment of the disclosure.

According to an embodiment of the disclosure, a server 100 may receive data on a surrounding environment of a plurality of display devices 200-1, 200-2, 200-3, . . . , 200-n from the plurality of display devices 200-1, 200-2, 200-3, . . . , 200-n.

Here, the data on the surrounding environment may be data associated with a lighting environment or an illuminance environment of a location at which the respective display devices 200-1, 200-2, 200-3, . . . , 200-n are positioned. To this end, the respective display devices 200-1, 200-2, 200-3, . . . , 200-n may include an illuminance sensor and a color sensor. Further, the respective display devices 200-1, 200-2, 200-3, . . . , 200-n may obtain an illuminance value of the surrounding environment sensed by the illuminance sensor, obtain a color temperature value of the surrounding environment sensed by the color sensor, and transmit the sensed values to the server 100.

In this case, the server 100 may identify an optimal image quality setting value corresponding to the surrounding environment by using data on the surrounding environment received from the plurality of display devices 200-1, 200-2, 200-3, . . . , 200-n, and transmit the same to the plurality of display devices 200-1, 200-2, 200-3, . . . , 200-n.

That is, users may be able to set image quality setting values of the plurality of display devices 200-1, 200-2, 200-3, . . . , 200-n suitable to their lighting environments. Accordingly, when determining an optimal image quality setting value corresponding to the surrounding environment using data on the surrounding environment received from the plurality of display devices 200-1, 200-2, 200-3, . . . , 200-n, a more optimal viewing experience may be provided to a user because preferences in image quality setting of a plurality of users according to an plurality of surrounding environments may be reflected. A method of determining an optimal image quality setting value will be described in greater detail below.

FIG. 1 shows display devices 200-1 and 200-2 being TVs, a display device 200-3 being a mobile phone, . . . , a display device 200-n being a kiosk (or, a smart signage), but this is merely one example. That is, the plurality of display devices 200-1, 200-2, 200-3, . . . , 200-n may be implemented as devices of various types which include a display and is able to display an image.

Figure 2:
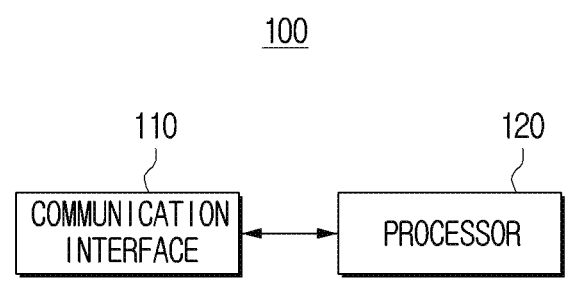
FIG. 2 is a block diagram of a server according to an embodiment of the disclosure.

FIG. 2 is a block diagram of a server according to an embodiment of the disclosure.

Referring to FIG. 2, the server 100 may include a communication interface 110 and at least one processor 120

The communication interface 110 may include circuitry, and perform communication with an external device.

Specifically, the communication interface 110 may perform communication with the plurality of display devices 200-1, 200-2, 200-3, . . . , 200-n. In this case, the communication interface 110 may transmit and receive various data with the plurality of display devices 200-1, 200-2, 200-3, . . . , 200-n.

To this end, the communication interface 110 may perform communication with the plurality of display devices 200-1, 200-2, 200-3, . . . , 200-n using various communication methods. For example, the communication interface 110 may perform communication with the plurality of display devices 200-1, 200-2, 200-3, . . . , 200-n through various communication methods such as, for example, and without limitation, a local area network (LAN), a wireless LAN, a Wi-Fi, and the like. To this end, the communication interface 110 may include a communication module.

The processor 120 may control the overall operation of the server 100. To this end, the processor 120 may include a central processing unit (CPU), and the like, control operations of each of the hardware provided in the server 100 by executing an operating system (O/S) or various applications stored in a memory provided in the server 100, and support each function.

First, the processor 120 may receive image quality setting values of each display device from the respective display devices 200-1, 200-2, 200-3, . . . , 200-n and sensing values of the surrounding environment obtained from each display device through the communication interface 110.

Here, the image quality setting value may include at least one from among a brightness value, a contrast value, a sharpness value, and an RGB color value of the display device.

Further, the sensing values of the surrounding environment may include an illuminance value and a color temperature value. To this end, the display device may include the illuminance sensor and the color sensor, and obtain the illuminance value of the surrounding environment of the display device using the illuminance sensor and obtain the color temperature value of the surrounding environment of the display device using the color sensor.

In addition, the processor 120 may receive information on an image quality mode of each display device from the respective display devices 200-1, 200-2, 200-3, . . . , 200-n through the communication interface 110.

Here, the image quality mode may be divided according to whether the display device is to set an image quality taking into consideration the surrounding environment and whether an image quality of an image which is to be displayed in the display is to be set using which image quality setting value.

For example, the image quality mode may include a first mode (or, an OFF mode), a second mode (or, an automatic setting mode), and a third mode (or, an artificial intelligence (AI) mode). Here, a user setting mode, the automatic setting mode, and the AI mode are merely terms used for designating each mode according to a function of each mode, and are not limited to the corresponding terms.

First, the first mode may mean a mode of setting an image quality value of the display device by a user setting regardless of the sensing values of the surrounding environment obtained from the display device. Accordingly, when the image quality mode is set in the first mode, the display device may be configured such that the image quality setting value of the display device is not changed according to the sensing values of the surrounding environment obtained from the display device, and the display device may display an image using the image quality setting value set according to a user input.

In addition, the second mode may mean a mode for setting an image quality value of a display device based on an image quality setting value pre-set in the display device according to the sensing values of the surrounding environment obtained from the display device. Further, the third mode may mean a mode for setting an image quality setting value of a display device based on an optimal image quality setting value received from the server 100.

That is, the display device may change the image quality setting value of the display device adaptively based on at least one from among surrounding brightness and the color temperature of the display device if the image quality mode is in the second mode or the third mode. In this case, the display device may use a pre-set value in a manufacturing stage of the display device if in the second mode, and may display an image using the image quality setting value received from the server 100 and not the pre-set value if in the third mode.

Further, the processor 120 may receive identification information of each display device from the respective display devices 200-1, 200-2, 200-3, . . . , 200-n through the communication interface 110. Here, the identification information may include a user identification ID, a model name of the display device, and the like.

The processor 120 may identify an optimal image quality setting value for each sensing value based on the received image quality setting value and the sensing value.

To this end, the processor 120 may classify the image quality setting value according to the sensing value. In this case, the sensing value may include at least one from among the illuminance value and the color temperature value. In addition, the image quality setting value may include at least one from among the brightness value, the contrast value, the sharpness value, and the RGB color value.

Here, the brightness value, the contrast value, and the sharpness value of the display device may be an index that affects an image quality of an image which is displayed in the display device according to brightness of a location at which the display device is positioned. In addition, the RGB color value of the display device may be an index that affects the image quality of the image which is displayed in the display device according to the color temperature of the location at which the display device is positioned.

Accordingly, the processor 120 may classify the brightness value, the contrast value, and the sharpness value according to the illuminance value, and in addition, classify the RGB color value according to the color temperature value.

Figure 3A:
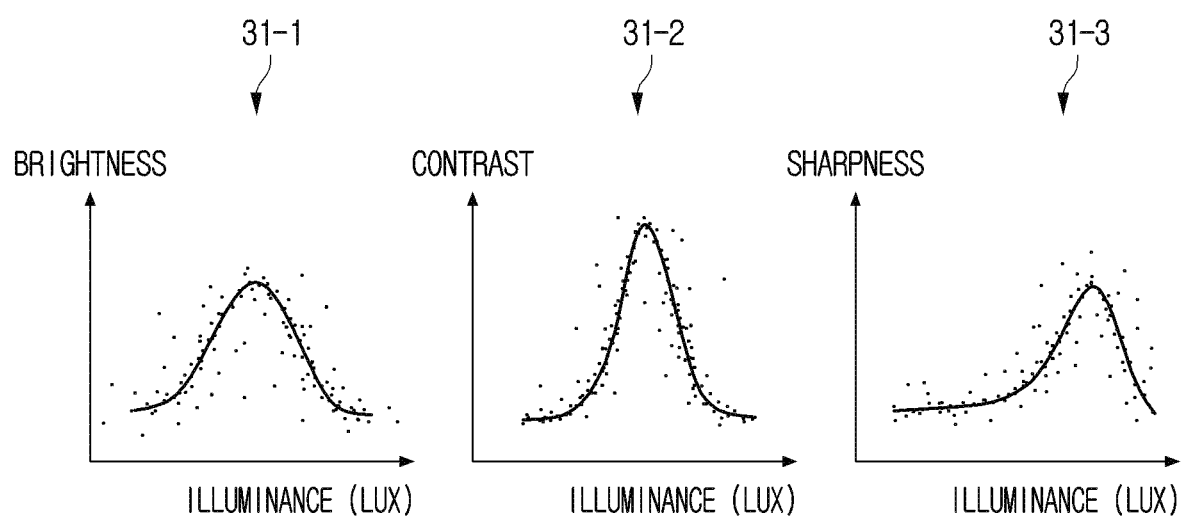
FIGS. 3A and 3B are graphs illustrating image quality setting values according to sensing values.

For example, graphs 31-1, 31-2 and 31-3 shown in FIG. 3A respectively show the brightness value, the contrast value, and the sharpness value according to the illuminance value. Further, graphs 32-1, 32-2, and 32-3 shown in FIG. 3B respectively show an R value, a G value, and a B value according to the color temperature value.

Specifically, the respective display devices 200-1, 200-2, 200-3, . . . , 200-n may obtain the illuminance value and the color temperature value by sensing the illuminance and the color temperature of the surrounding environment. Then, the respective display devices 200-1, 200-2, 200-3, . . . , 200-n may identify the brightness value, the contrast value, the sharpness value, and the RGB color value set in the respective display devices 200-1, 200-2, 200-3, . . . , 200-n at a time-point at which the illuminance value and the color temperature value are to be obtained. Further, the respective display devices 200-1, 200-2, 200-3, . . . , 200-n may transmit the illuminance value, the color temperature value, the brightness value, the contrast value, the sharpness value, and the RGB color value to the server 100.

Accordingly, in the graphs 31-1, 31-2, and 31-3 shown in FIG. 3A, x-axes may represent the illuminance values received from the plurality of display devices 200-1, 200-2, 200-3, . . . , 200-n, and y-axes may respectively represent the brightness value, the contrast value, and the sharpness value of the respective display devices at the time-point at which the illuminance value are obtained.

Figure 3B:
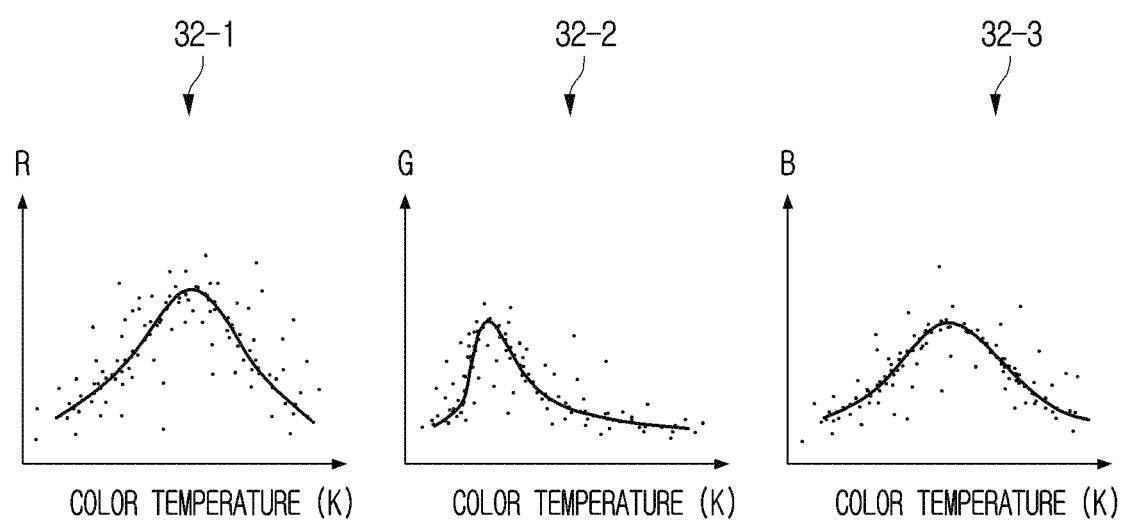

In addition, in graphs 32-1, 32-2, and 32-3 shown in FIG. 3B, the x-axes may represent the color temperature values received from the plurality of display devices 200-1, 200-2, 200-3, . . . , 200-n, and the y-axes may respectively represent the R value, the G value, and the B value set in the respective display devices at the time-point at which the color temperature values are obtained.

Accordingly, the processor 120 may identify a plurality of image quality setting values corresponding to each sensing value by sensing value. That is, the processor 120 may identify, by sensing value, the at least one image quality setting value set in the at least one display device at the time-point at which each sensing value is obtained.

Further, the processor 120 may identify the optimal image quality setting value by sensing value.

Specifically, the processor 120 may identify, based on the received image quality setting value and the sensing value, the plurality of image quality setting values corresponding to each sensing value by sensing value, and identify a median value from among the identified plurality of image quality setting values as the optimal image quality setting value that corresponds to each sensing value.

Here, the median value may mean an image quality setting value positioned at a center when listing the image quality setting values in order of size.

That is, the processor 120 may list the plurality of image quality setting values corresponding to the sensing values in the order of size, identify the median value from among the plurality of image quality setting values based on a number of the plurality of image quality setting values, and identify the identified median value as the optimal image quality setting value of the corresponding sensing values.

In this case, as described above, the brightness value, the contrast value, and the sharpness value are classified according to the illuminance value, and the R value, the G value, and the B value may be classified according to the color temperature value.

Accordingly, the processor 120 may identify an optimal brightness value, an optimal contrast value, and an optimal sharpness value by identifying median values from a plurality of brightness values, a plurality of contrast values, and a plurality of sharpness values, respectively, which correspond to each illuminance value. Then, the processor 120 may identify an optimal R value, an optimal G value, and an optimal B value by identifying median values from a plurality of R values, a plurality of G values, and a plurality of B values, respectively, which correspond to each color temperature value.

Figure 4A:
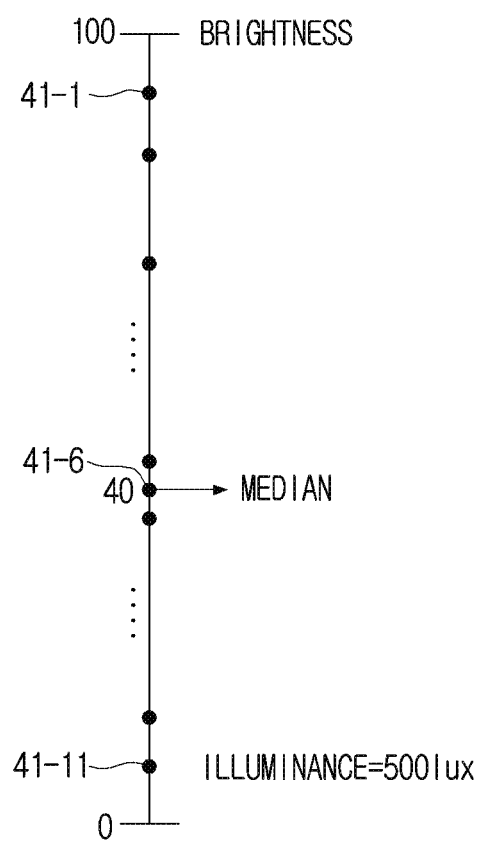
FIGS. 4A, 4B, 4C, and 4D are diagrams illustrating a process of identifying an optimal image quality setting value corresponding to a surrounding environment.

For example, as in FIG. 4A, it may be assumed that there are eleven brightness values 41-1, 41-2, . . . , 41-6, . . . , and 41-11 corresponding to an illuminance value of 500 lux which are present. That is, in an environment in which at least one display device from among the plurality of display devices 200-1, 200-2, 200-3, . . . , 200-n has an illuminance value of 500 lux, there may be eleven cases in which the brightness value is set or changed according to the user input.

In this case, the processor 120 may identify the brightness value which is the median value from among the eleven brightness values 41-1, 41-2, . . . , 41-6, . . . , and 41-11, that is, identify the brightness value 41-6 of 40 as the optimal brightness value of the 500 lux illuminance value. However, in FIG. 4A, although identifying the optimal brightness value of the 500 lux illuminance value has been described, the above is one example, and an optimal brightness value of the respective other illuminance values may be identified using the same method as described above. In addition, an optimal contrast value and an optimal sharpness value may be determined using the same method as described above for the contrast value and the sharpness value.

Figure 4B:
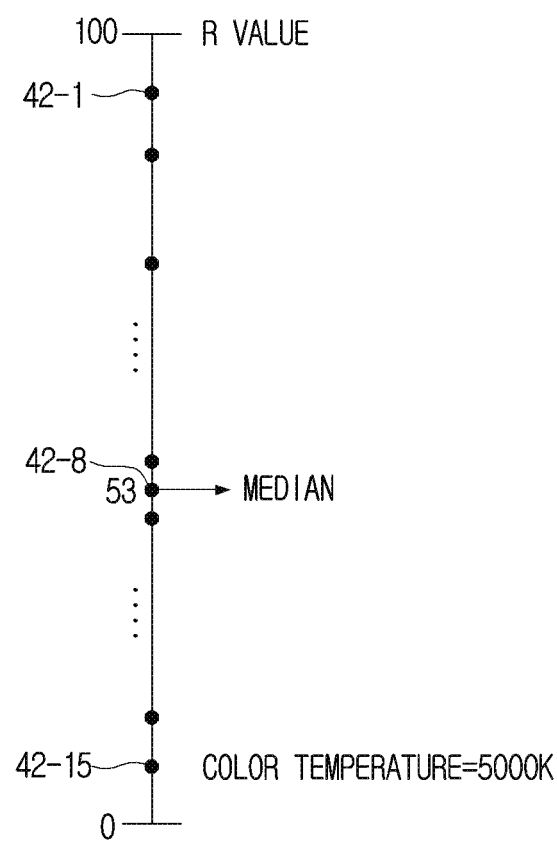

In another example, as in FIG. 4B, it may be assumed that there are fifteen R values 42-1, 42-2, . . . , 42-8, . . . , and 42-15 corresponding to color temperature values of 5000K which are present. That is, in a lighting environment in which at least one display device from among the plurality of display devices 200-1, 200-2, 200-3, . . . , 200-n has a color temperature value of 5000 K, there may be fifteen cases in which the R value is set or changed according to the user input.

In this case, the processor 120 may identify the R value which is the median value from among the fifteen R values 42-1, 42-2, . . . , 42-8, . . . , and 42-15, that is, identify the R value 42-8 of 53 as the optimal R value of the 5000 K color temperature value. However, in FIG. 4B, although identifying the optimal R value has been described, the above is one example, and an optimal R value of the respective other color temperature values may be identified using the same method as described above. In addition, an optimal G value and an optimal B value may be determined using the same method as described above for the G value and the B value.

In another example, the processor 120 may identify the plurality of image quality setting values corresponding to each sensing value by sensing value based on the received image quality setting value and the sensing value, divide the identified plurality of image quality setting values into a plurality of sections, identify a section in which the image quality setting values belong the most from among the plurality of sections, and identify a median value of the identified section as an optimal image quality setting value that corresponds to each sensing value.

Here, the dividing the identified plurality of image quality setting values into a plurality of sections may mean dividing an entire range that the image quality setting values can have into a plurality of sections having the same size, respectively, and classifying the plurality of image quality setting values into the plurality of sections.

That is, the processor 120 may divide the an entire range that the image quality setting values may can have into a plurality of sections having the same size, respectively, and after classifying the plurality of image quality setting values into the plurality of sections, identify a section in which the image quality setting values belong the most from among the plurality of sections based on a number of the plurality of image quality setting values included in the corresponding section, and identify a median value of the identified section as the optimal image quality setting value that corresponds to each sensing value.

In this case, as described above, the brightness value, the contrast value, and the sharpness value may be classified according to the illuminance value, and the R value, the G value, and the B value may be classified according to the color temperature value.

Accordingly, the processor 120 may identify the optimal brightness value, the optimal contrast value, and the optimal sharpness value by identifying a median value of a section in which values from the respective brightness values, the respective contrast values, and the respective sharpness values corresponding to each illuminance value belong the most. Further, the processor 120 may identify the optimal R value, the optimal G value, and the optimal B value by identifying a median value of a section in which values from the respective R values, the respective G values, and the respective B values corresponding to each color temperature value belong the most.

Figure 4C:
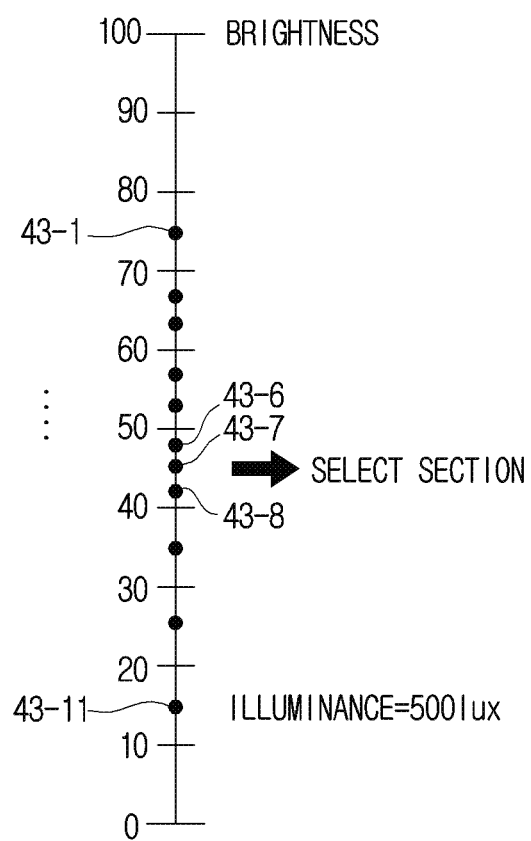

For example, as in FIG. 4C, it may be assumed that there are eleven brightness values 43-1, 43-2, . . . , 43-6, 43-7, 43-8, . . . , and 43-11 corresponding to an illuminance value of 500 lux which are present. That is, in a lighting environment in which at least one display device from among the plurality of display devices 200-1, 200-2, 200-3, . . . , 200-n has an illuminance value of 500 lux, there may be eleven cases in which the brightness value is set or changed according to the user input.

In this case, the processor 120 may divide 0 to 100 which is the entire range that the brightness value can have into a plurality of sections having a size of 10, respectively. Then, the processor 120 may identify a section 40 to 50 which is the section in which brightness values 43-6, 43-7, and 43-8 belong the most from among the plurality of sections based on a number of brightness values included in each section. Then, the processor 120 may identify 45 which is the median value of the identified section 40 to 50 as the optimal brightness value of the 500 lux illuminance value.

However, although identifying the optimal brightness value of the 500 lux illuminance value has been described in FIG. 4C, the above is one example, and an optimal brightness value of the respective other illuminance values may be identified using the same method as described above. In addition, an optimal contrast value and an optimal sharpness value may be determined using the same method as described above for the contrast value and the sharpness value.

Figure 4D:
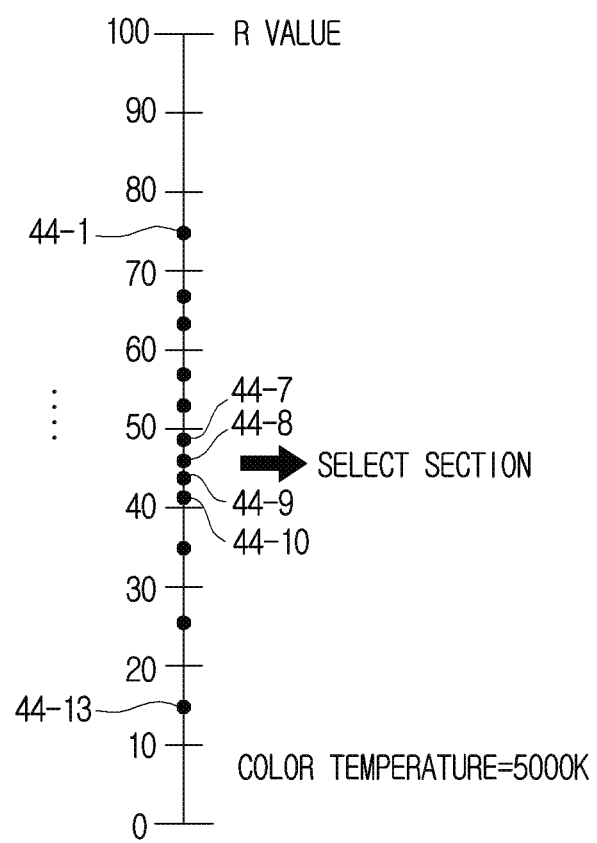

In another example, as in FIG. 4D, it may be assumed that there are thirteen R values 44-1, . . . , 44-7, 44-8, 44-9, 44-10, . . . , and 44-13 corresponding to the color temperature value of 5000K which are present. That is, in an environment in which at least one display device from among the plurality of display devices 200-1, 200-2, 200-3, . . . , 200-n has a color temperature value of 5000 K, there may be fifteen cases in which the R value is set or changed according to the user input.

In this case, the processor 120 may divide 0 to 100 which is the entire range that the R value can have into a plurality of sections having a size of 10, respectively. Then, the processor 120 may identify a section 40 to 50 which is the section in which R values 44-7, 44-8, 44-9, and 44-10 belong the most from among the plurality of sections based on a number of R values included in each section. Then, the processor 120 may identify 45 which is the median value of the identified section 40 to 50 as the optimal R value of the 5000 K color temperature value.

However, in FIG. 4D, although identifying the optimal R value has been described, the above is one example, and an optimal R value of the respective other color temperature values may be identified using the same method as described above. In addition, an optimal G value and an optimal B value may be determined using the same method as described above for the G value and the B value.

That is, there are not many cases of users changing the image quality setting values associated with illuminance such as, brightness, contrast, and sharpness according to the color temperature of the environment in which the display device is positioned, and in addition, there are not many cases of changing the image quality setting values associated colors such as the RGB values according to the illuminance of the environment in which the display device is positioned. Accordingly, according to the various embodiments of the disclosure, a more optimal image quality may be provided to the user through an effective data collection and an optimization process of separating the image quality setting value associated with illuminance and the image quality setting value associated with color and identifying an optimal image quality value of both.

That is, effective data collection and optimization may be possible by carrying out optimization by the illuminance value sensed by the illuminance sensor regardless of the color temperature when determining the optimal image quality setting value of the brightness value, the contrast value, and the sharpness value associated with illuminance, and by carrying out optimization by the color temperature value sensed by the color temperature sensor regardless of illuminance when determining the optimal image quality setting value of the RGB values associated with the color temperature.

In addition, according to the various embodiments of the disclosure, an optimal image quality setting value reflected with preferences of various users who use the display device may be determined based on determining a median value among a plurality of image quality setting values corresponding to each sensing value, or a median value of a section in which image quality setting values belong the most among the plurality of sections in which the plurality of image quality setting values corresponding to each sensing value are divided as the optimal image quality value.

The display devices may be configured such that types, positions, and the like of sensors for sensing illuminance and color temperature are different from one another by model. Accordingly, even if the display devices are in a same environment, information on the surrounding environment sensed through the sensor may vary if the model of the display device is different. Accordingly, in the disclosure, a more optimized image quality setting value may be provided to the user by identifying an optimal image quality setting value of each model by the model of the display device.

That is, the processor 120 may divide the image quality setting values of each display device and the sensing values of the surrounding environment obtained from each display device into a plurality of groups based on model names of the plurality of display devices, and identify an optimal image quality setting value for each sensing value based on the image quality setting values and the sensing values included in the plurality of groups, respectively.

Specifically, the processor 120 may divide the image quality setting values of the respective display devices 200-1, 200-2, 200-3, . . . , 200-n and the sensing values of the surrounding environment obtained from the respective display devices 200-1, 200-2, 200-3, . . . , 200-n into the plurality of groups based on the model names of the plurality of display devices 200-1, 200-2, 200-3, . . . , 200-n.

To this end, the processor 120 may divide the image quality setting values and the sensing values of the plurality of display devices 200-1, 200-2, 200-3, . . . , 200-n into the plurality of groups for the image quality setting values and the sensing values of display devices having the same model name to belong in a same group.

Further, the processor 120 may identify the optimal image quality setting value for each sensing value based on the image quality setting values and the sensing values included in the respective groups.

That is, the processor 120 may identify the optimal image quality setting value for each sensing value of the each model name by model name of the display device. In this case, a method of determining the optimal image quality setting value may be as described above. That is, the processor 120 may classify the image quality setting values included in each group by sensing value, and identify the optimal image quality setting value corresponding to each sensing value by sensing value. A detailed description of a method of identifying an optimal image quality setting value corresponding to each sensing value will be omitted for being the same as described above.

The processor 120 may identify a display device in which the image quality mode is set in a pre-set mode from among the plurality of display devices 200-1, 200-2, 200-3, . . . , 200-n based on the received information on the image quality mode.

Here, the pre-set mode may mean the third mode from among the above-described image quality modes. The third mode may refer to a mode for setting an image quality value of a display device based on the optimal image quality setting value received from the server 100 according to the sensing values of the surrounding environment obtained from the display device.

Further, the processor 120 may transmit, based on the optimal image quality setting value for each sensing value, the optimal image quality setting value corresponding to the sensing values of the surrounding environment sensed from the identified display device to the identified display device through the communication interface 110.

That is, the processor 120 may identify the display device in which the image quality mode is set in the third mode from among the plurality of display devices 200-1, 200-2, 200-3, . . . , 200-n, and identify the optimal image quality setting value corresponding to the sensing value received from the identified display device from among the optimal image quality setting values corresponding to each sensing value by sensing value. Further, the processor 120 may transmit the identified optimal image quality setting value to the display device through the communication interface 110.

For example, it may be assumed that the processor 120 identifies the illuminance value as 500 lux and the color temperature value as 5000 K, which are obtained from the display device set in the third mode.

In this case, the processor 120 may identify the optimal brightness value, the optimal contrast value and the optimal sharpness value of the 500 lux illuminance value from among the optimal image quality setting values for each illuminance value, and identify the optimal R value, the optimal G value, and the optimal B value of the 5000 K color temperature from among the optimal image quality setting values for each color temperature value. Further, the processor 120 may transmit the identified optimal brightness value, contrast value, and sharpness value, the optimal R value, the optimal G value, and the optimal B value to the display device through the communication interface 110.

The processor 120 may identify a model name of the display device set in the third mode, identify an optimal image quality setting value of the display device based on the model name, and transmit the identified optimal image quality setting value to the display device through the communication interface 110.

That is, as described above, an optimal image quality setting value corresponding to each model name may be identified by model name. In this case, the processor 120 may identify the optimal image quality setting value corresponding to the model name of the display device from among the optimal image quality setting values corresponding to each model name by model name. Further, the processor 120 may transmit the identified optimal image quality setting value to the display device through the communication interface 110.

For example, it may be assumed that the processor 120 identifies the illuminance value as 500 lux, the color temperature value as 5000 K, and the model name of the display device as XXX which are obtained from the display device set in the third mode.

In this case, the processor 120 may identify the optimal image quality setting values for each illuminance value and the optimal image quality setting values for each color temperature value of an XXX model name from among a plurality of model names. Further, the processor 120 may identify the optimal brightness value, the optimal contrast value, and the optimal sharpness value of the 500 lux illuminance value from among the optimal image quality setting values for each illuminance value, and identify the optimal R value, the optimal G value, and the optimal B value of the 5000 K color temperature from among the optimal image quality setting values for each color temperature. Further, the processor 120 may transmit the identified optimal brightness value, contrast value, and sharpness value, the optimal R value, the optimal G value, and the optimal B value to the display device through the communication interface 110.

In the above-described example, the processor 120 has been described as identifying the display device in which the image quality mode is set in the third mode, and transmitting the optimal image quality setting value to the corresponding display device. However, the above is one example, and the processor 120 may transmit the optimal image quality setting value to the display device even if the image quality mode is not set in the third mode, or even if there is no separate request.

Figure 5:
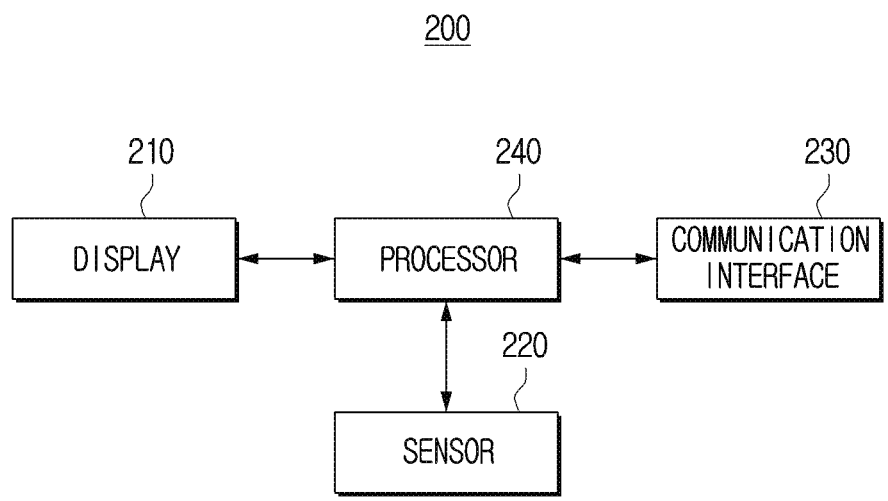
FIG. 5 is a block diagram of a display device according to an embodiment of the disclosure.

FIG. 5 is a block diagram of a display device according to an embodiment of the disclosure.

Referring to FIG. 5, a display device 200 may include a display 210, a sensor 220, a communication interface 230, and at least one processor 240.

The display 210 may display content. The display 210 may be implemented as a display of various types such as, for example, and without limitation, a liquid crystal display (LCD), a light emitting diode (LED), an organic light emitting diode (OLED), and the like.

The display 210 may additionally include additional configuration according to the implementation method thereof. For example, if the display 210 employs a liquid crystal method, the display 210 may include an LCD display panel, a backlight unit which supplies light thereto, a panel driving substrate which drives a panel, and the like.

The sensor 220 may sense information on the surrounding environment of the display device 200. To this end, the sensor 220 may include the illuminance sensor capable of sensing the illuminance and the color sensor capable of sensing the color temperature surrounding the display device 200.

The communication interface 230 may include circuitry, and perform communication with an external device.

Specifically, the communication interface 230 may perform communication with the server 100. In this case, the communication interface 230 may transmit and receive various data with the server 100.

To this end, the communication interface 230 may perform communication with the server 100 using various communication methods. For example, the communication interface 230 may perform communication with the server 100 through various communication methods such as, for example, and without limitation, a LAN, a wireless LAN, Wi-Fi, and the like. To this end, the communication interface 230 may include a communication module.

The processor 240 may control the overall operation of the display device 200. To this end, the processor 240 may include a central processing unit (CPU), and the like, and control operations of each of the hardware provided in the display device 200 and support various functions by executing the operating system (O/S) or various applications stored in the memory provided in the display device 200.

The processor 240 may transmit the image quality setting values, the sensing values of the surrounding environment sensed from the sensor 220, and information of the image quality mode of the display device 200 to the server 100 through the communication interface 230, and receive the optimal image quality setting value which corresponds to the sensing value from the server 100 through the communication interface 230.

At this time, the processor 240 may transmit the image quality setting values and the sensing values to the server 100 through the communication interface 230 if information on the surrounding environment received from the sensor 220 is changed, or if an image quality setting is changed by the user. Further, the processor 240 may receive the optimal image quality setting value from the server 100 according to the transmission of the image quality setting values and the sensing values.

Specifically, the display device 200 may waste power, memory capacity, and the like for performing communication when continuing to perform communication with the server 100 even when the illuminance, the color temperature, and the like of the surrounding environment are constant, and the image quality setting is maintained. Accordingly, the processor 240 may perform effective communication by controlling the communication interface 230 to communicate with the server 100 only when information on the surrounding environment is changed, or when the image quality setting is changed.

However, the above is merely one example, and the processor 240 may transmit the image quality setting values and the sensing values to the server 100 through the communication interface 230 at certain time intervals or random time intervals.

In addition, if the image quality setting is changed while the image quality mode of the display device 200 is in a state of AI mode, the processor 240 may copy and transmit as a plurality of data sets when transmitting the data set which includes the image quality setting values to the server 100 through the communication interface 230.

That is, when changing the image quality setting of the display device 200 despite the image quality being set based on the optimal image quality setting value received from the server 100 while the image quality mode is in the AI mode state, the optimal image quality setting value may be identified by more specifically reflecting user preference of the image quality setting by placing weight values to user intent desiring the change in image quality setting.

As described above, when copying to the plurality of data sets, a number of samples of the corresponding data set may increase. Accordingly, in the process of the optimal image quality setting value being identified by the processor 120 of the server 100, the corresponding data set may have an effect such as weight values having been added.

Figure 6A:
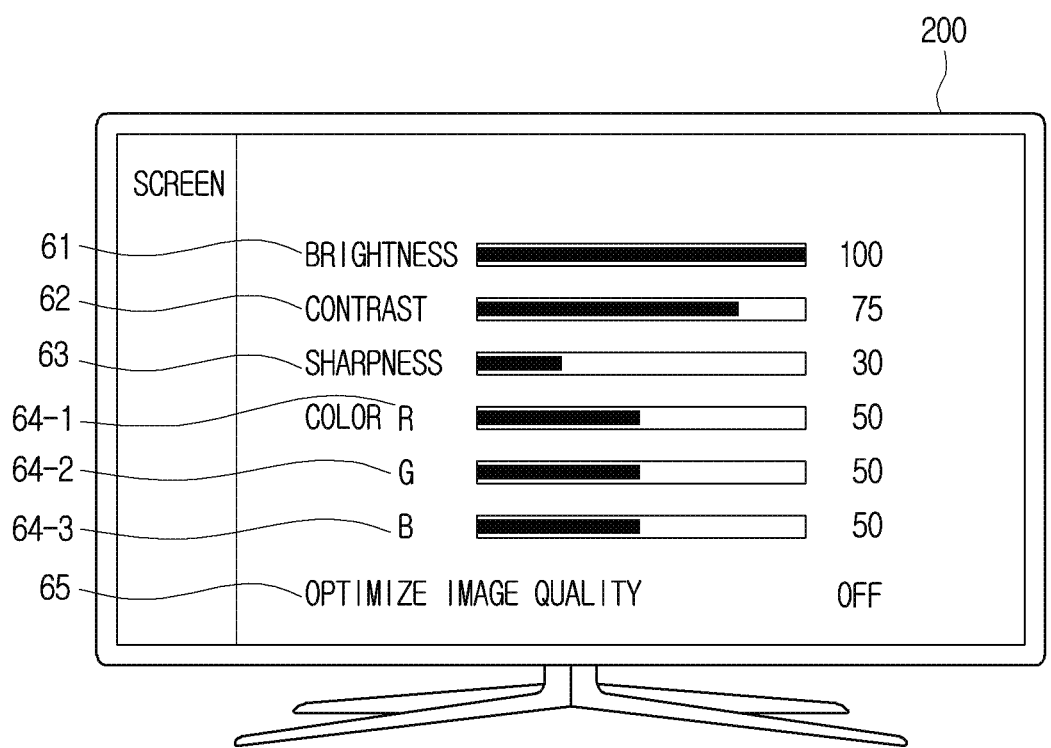
FIG. 6A is a diagram illustrating an individual display setting screen according to an embodiment of the disclosure.

FIG. 6A is a diagram illustrating an individual display setting screen according to an embodiment of the disclosure.

Referring to FIG. 6A, the processor 240 may display a UI for controlling an image quality of an image which is displayed in the display 210 in the display 210. At this time, image quality setting items included in the UI may include a brightness 61, a contrast 62, a sharpness 63, RGB color values 64-1, 64-2, and 64-3, an image quality mode 65, and the like.

The processor 240 may form a data set for transmitting the image quality setting values, the sensing values of the surrounding environment, and information on the image quality mode of the display device 200 to the server 100. Elements forming the data set may include an identification ID, a model name, an image quality mode, image quality setting values, sensing values of the surrounding environment, and the like of the display device 200.

FIG. 6B is an example diagram of a data set which is transmitted by a display device to a server according to an embodiment of the disclosure.

Referring to FIG. 6B, the processor 240 may form a data set including the user identification ID, and the model name, a screen mode, the image quality mode, the image quality setting values (the brightness value, the contrast value, the sharpness value, and RGB color values, the sensing values of the surrounding environment (the illuminance sensor value, and the color sensor color temperature value) of the display device.

The user identification ID may mean an identification code of individual display devices. The server 100 may identify individual display devices even if it is a display device of a same model through the user identification ID.

The display model name may mean a model of the display device. The above may be determined by a pre-set code at a manufacturing stage, and a type of the display device may be distinguished by the corresponding code.

The screen mode may be a mode for setting an image quality setting concept according to content displayed in the display device, and may include a first mode (or, a 'user adjustment' mode) in which image quality is set with a user set value, a second mode in which sharpness is higher compared to other image quality values for movie viewings, a third mode in which brightness value is higher compared to other image quality values for sports match viewings, and the like. However, the above is merely one example, and the screen mode is not limited to the above-described example. In addition, the processor 240 may include information on the screen mode by coding in a method such as the first mode being 0, the second mode being 1, and the third mode being 2. However, the above merely provides an example of random other numbers to represent the different image quality modes in code, and is not limited to the above.

The image quality mode may include the first mode, the second mode, the third mode, and the like as described above, but the processor 240 may include information on the image quality mode by coding in the method such as the first mode being 0, the second mode being 1, and the third mode being 2. However, the above merely provides an example of random other numbers to represent the different image quality modes in code, and is not limited to the above.

The processor 240 may form the image quality setting values and the sensing values of the surrounding environment together with the above-described user identification ID, the display model name, and the image quality mode into one data set and transmit to the server 100 through the communication interface 230.

FIG. 7 is a flowchart illustrating an control method of a server which provides an optimal image quality setting value corresponding to a surrounding environment of a display device according to an embodiment of the disclosure.

First, the image quality setting values of each display device, the sensing values of the surrounding environment obtained from each display device, and information on the image quality mode of each display device may be received from the respective display devices (S710).

Then, the optimal image quality setting value for each sensing value may be identified based on the received image quality setting values and the sensing values (S720).

Then, the display device in which the image quality mode is set in the pre-set mode may be identified from among the plurality of display devices based on the received information on the image quality mode (S730).

In addition, the optimal image quality setting value corresponding to the sensing value of the surrounding environment which is sensed from the identified display device may be transmitted to the identified display device based on the optimal image quality setting value for each sensing value (S740).

Here, the image quality setting values of each display device may include at least one from among the brightness value, the contrast value, the sharpness value, and the RGB color values of each display device.

Here, the respective display devices may include the illuminance sensor and the color sensor, and the sensing values of the surrounding environment obtained from each display device may include the illuminance value obtained through the illuminance sensor and the color temperature value obtained through the color sensor from each display device.

Here, the identifying the optimal image quality setting value for each sensing value may include identifying a first optimal image quality setting value by the illuminance value based on the illuminance value of each display device received through the communication interface, identifying a second optimal image quality setting value by color temperature value based on the color temperature value of each display device received through the communication interface, in which the first optimal image quality setting value may include the brightness value, the contrast value, and the sharpness value, and the second optimal image quality setting value may include the RGB color values.

In addition, the pre-set mode may be the third mode from among the first mode for setting the image quality value of the display device by the user setting regardless of the sensing values of the surrounding environment obtained from the display device, the second mode for setting the image quality value of the display device based on the image quality setting value pre-set in the display device according to the sensing values of the surrounding environment obtained from the display device, and the third mode for setting the image quality value of the display device based on the optimal image quality setting value received from the server according to the sensing values of the surrounding environment obtained from the display device.

Further, the identifying the optimal image quality setting value for each sensing value may include identifying the plurality of image quality setting values corresponding to each sensing value by sensing value based on the received image quality setting values and the sensing values, and identifying the median value from among the identified plurality of image quality setting values as the optimal image quality setting value corresponding to each sensing value.

In addition, the identifying the optimal image quality setting value for each sensing value may include identifying the plurality of image quality setting values corresponding to each sensing value by sensing value based on the received image quality setting value and the sensing value, dividing the image quality setting values into the plurality of sections of a pre-set size, identifying the section in which the identified plurality of image quality setting values belong the most from among the plurality of sections, and identifying the median value of the corresponding section as the optimal image quality setting value corresponding to each sensing value.

According to an embodiment of the disclosure, the various embodiments described above may be implemented with software including instructions stored in a machine-readable storage media (e.g., computer). The machine may call a stored instruction from the storage medium, and as a device operable according to the called instruction, may include the machine according to the above-mentioned embodiments. Based on a command being executed by the processor, the processor may directly or using other elements under the control of the processor perform a function corresponding to the command. The command may include a code generated by a compiler or executed by an interpreter. The machine-readable storage medium may be provided in the form of a non-transitory storage medium. Herein, 'non-transitory' merely means that the storage medium is a tangible device and does not include a signal (e.g., electromagnetic waves), and the term does not differentiate data being semi-permanently stored or being temporarily stored in the storage medium. For example, the 'non-transitory storage medium' may include a buffer in which data is temporarily stored.

According to an embodiment, a method according to the various embodiments described herein may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™) or directly between two user devices (e.g., smartphones). In the case of online distribution, at least a portion of the computer program product (e.g., downloadable app) may be stored at least temporarily in the storage medium readable by a machine such as a server of a manufacturer, a server of an application store, or a memory of a relay server, or temporarily generated.

While example embodiments of the disclosure have been shown and described above, the disclosure is not limited to the specific embodiments described above and various modifications may be made therein by those skilled in the art to which this disclosure pertains without departing from the spirit and scope of the disclosure, and such modifications shall not be understood as separate from the technical concept or outlook of the disclosure.

What is claimed is:

1. A server comprising:
    a communication interface; and
    at least one processor configured to:
    receive, from a plurality of display devices through the communication interface, image quality setting values of each display device of the plurality of display devices, sensing values of a surrounding environment obtained from each display device of the plurality of display devices, and information on an image quality mode of each display device of the plurality of display devices,
    identify, based on the received image quality setting values and the sensing values, an optimal image quality setting value for each sensing value,
    identify, based on the received information on the image quality mode, a display device in which the image quality mode is set in a pre-set mode from among the plurality of display devices, and
    based on the optimal image quality setting value for each sensing value, identify a first optimal image quality setting value corresponding to the sensing values of the surrounding environment sensed by the identified display device and transmit the first optimal image quality setting value to the identified display device through the communication interface.

2. The server of claim 1, wherein the image quality setting values of each display device comprise at least one of a brightness value, a contrast value, a sharpness value, and RGB color values of a corresponding display device of the plurality of display devices.

3. The server of claim 2, wherein each of the plurality of display devices comprises an illuminance sensor and a color sensor, and
    wherein the sensing values of the surrounding environment obtained from each display device comprise an illuminance value obtained through the illuminance sensor and a color temperature value obtained through the color sensor of each display device.

4. The server of claim 3, wherein the at least one processor is further configured to:
    identify a second optimal image quality setting value based on the illuminance value of each display device received through the communication interface, and
    identify a third optimal image quality setting value based on the color temperature value of each display device received through the communication interface,
    wherein the second optimal image quality setting value comprises the brightness value, the contrast value, and the sharpness value, and
    wherein the third optimal image quality setting value comprises the RGB color values.

5. The server of claim 1, wherein the pre-set mode is a third mode from among a first mode for setting a first image quality setting value of a display device by a user setting regardless of the sensing values of the surrounding environment received from the display device, a second mode for setting a second image quality setting value of the display device based on a pre-set image quality setting value pre-set in the display device according to the sensing values of the surrounding environment received from the display device, and the third mode for setting a third image quality setting value of the display device based on the first optimal image quality setting value received from the server according to the sensing values of the surrounding environment received from the display device.

6. The server of claim 1, wherein the at least one processor is further configured to:
   identify, based on the received image quality setting values and the sensing values, a plurality of image quality setting values corresponding to each sensing value, and
   identify a median value from among the identified plurality of image quality setting values as the optimal image quality setting value corresponding to each sensing value.

7. The server of claim 1, wherein the at least one processor is further configured to:
   identify, based on the received image quality setting values and the sensing values, a plurality of image quality setting values corresponding to each sensing value, divide the identified plurality of image quality setting values into a plurality of sections,
   identify a section in which image quality setting values belong the most from among the plurality of sections, and
   identify a median value of the identified section as the optimal image quality setting value corresponding to each sensing value.

8. The server of claim 1, wherein the at least one processor is further configured to:
   divide the image quality setting values of each device and the sensing values of the surrounding environment obtained from each display device into a plurality of groups based on model names of the plurality of display devices, and
   identify, based on the image quality setting values and the sensing values in the respective groups, the optimal image quality setting value for each sensing value.

9. A control method of a server, the control method comprising:
   receiving, from a plurality of display devices, image quality setting values of each display device of the plurality of display devices, sensing values of a surrounding environment obtained from each display device of the plurality of display devices, and information on an image quality mode of each display device of the plurality of display devices;
   identifying, based on the received image quality setting values and the sensing values, an optimal image quality setting value for each sensing value;
   identifying, based on the received information on the image quality mode, a display device in which the image quality mode is set in a pre-set mode from among the plurality of display devices; and
   based on the optimal image quality setting value for each sensing value, identify a first optimal image quality setting value corresponding to the sensing values of the surrounding environment sensed by the identified display device and transmitting the first optimal image quality setting value to the identified display device.

10. The control method of claim 9, wherein the image quality setting value of each display device comprises at least one of a brightness value, a contrast value, a sharpness value, and RGB color values of each display device.

11. The control method of claim 10, wherein each of the plurality of display devices comprises an illuminance sensor and a color sensor, and
   wherein the sensing values of the surrounding environment obtained from each display device comprise an illuminance value obtained through the illuminance sensor and a color temperature value obtained through the color sensor of each display device.

12. The control method of claim 11, wherein the identifying the optimal image quality setting value for each sensing value comprises:
   identifying a second optimal image quality setting value based on the illuminance value of each display device received through a communication interface; and
   identifying a third optimal image quality setting value based on the color temperature value of each display device received through the communication interface,
   wherein the second optimal image quality setting value comprises the brightness value, the contrast value, and the sharpness value, and
   wherein the third optimal image quality setting value comprises the RGB color values.

13. The control method of claim 9, wherein the pre-set mode is a third mode from among a first mode for setting a first image quality setting value of a display device by a user setting regardless of the sensing values of the surrounding environment obtained from the display device, a second mode for setting a second image quality setting value of the display device based on a pre-set image quality setting value pre-set in the display device according to the sensing values of the surrounding environment obtained from the display device, and the third mode for setting a third image quality setting value of the display device based on the first optimal image quality setting value received from the server according to the sensing values of the surrounding environment obtained by the display device.

14. The control method of claim 9, wherein the identifying the optimal image quality setting value for each sensing value comprises:
   identifying, based on the received image quality setting values and the sensing values, a plurality of image quality setting values corresponding to each sensing value; and
   identifying a median value from among the identified plurality of image quality setting values as the optimal image quality setting value corresponding to each sensing value.

15. The control method of claim 9, wherein the identifying the optimal image quality setting value for each sensing value comprises:
   identifying, based on the received image quality setting values and the sensing values, a plurality of image quality setting values corresponding to each sensing value;
   dividing the identified plurality of image quality setting values into a plurality of sections;
   identifying a section in which image quality setting values belong the most from among the plurality of sections; and
   identifying a median value of the identified section as the optimal image quality setting value corresponding to each sensing value.

16. The control method of claim 9, further comprising:
   dividing the image quality setting values of each device and the sensing values of the surrounding environment obtained from each display device into a plurality of groups based on model names of the plurality of display devices; and
   identifying based on the image quality setting values and the sensing values in the respective groups, the optimal image quality setting value for each sensing value.

17. A non-transitory computer readable recording medium storing computer instructions that cause a server to perform an operation when executed by a processor of the server, wherein the operation comprises;
    receiving, from a plurality of display devices, image quality setting values of each display device of the plurality of display devices, sensing values of a surrounding environment obtained from each display device of the plurality of display devices, and information on an image quality mode of each display device of the plurality of display devices;
    identifying, based on the received image quality setting values and the sensing values, an optimal image quality setting value for each sensing value;
    identifying, based on the received information on the image quality mode, a display device in which the image quality mode is set in a pre-set mode from among the plurality of display devices; and
    based on the optimal image quality setting value for each sensing value, identify a first optimal image quality setting value corresponding to the sensing values of the surrounding environment sensed by the identified display device and transmitting the first optimal image quality setting value to the identified display device.

18. The non-transitory computer rea able recording medium of claim 17, wherein the image quality setting value of each display device comprises at least one of a brightness value, a contrast value, a sharpness value, and RGB color values of each display device.

19. The non-transitory computer readable recording medium of claim 18, wherein each of the plurality of display devices comprises an illuminance sensor and a color sensor, and
    wherein the sensing values of the surrounding environment obtained from each display device comprise an illuminance value obtained through the illuminance sensor and a color temperature value obtained through the color sensor of each display device.

20. The non-transitory computer recording medium of claim 19, wherein the identifying the optimal image quality setting value for each sensing value comprises:
    identifying a second optimal image quality setting value based on the illuminance value of each display device received through a communication interface; and
    identifying a third optimal image quality setting value based on the color temperature value of each display device received through the communication interface,
    wherein the second optimal image quality setting value comprises the brightness value, the contrast value, and the sharpness value, and
    wherein the third optimal image quality setting value comprises the RGB color values.

\* \* \* \* \*